(12) United States Patent
Yu et al.

(10) Patent No.: US 11,661,663 B2
(45) Date of Patent: May 30, 2023

(54) WATER ELECTROLYSIS SYSTEM

(71) Applicants: Hyundai Motor Company, Seoul (KR); Kia Motors Corporation, Seoul (KR)

(72) Inventors: Jung Han Yu, Gyeonggi-do (KR); Ju Han Kim, Gyeonggi-Do (KR); Bo Ki Hong, Seoul (KR); Keun Bong Ham, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 267 days.

(21) Appl. No.: 17/092,501

(22) Filed: Nov. 9, 2020

(65) Prior Publication Data

US 2021/0395116 A1 Dec. 23, 2021

(30) Foreign Application Priority Data

Jun. 22, 2020 (KR) .......................... 10-2020-0075496

(51) Int. Cl.
*C25B 15/031* (2021.01)
*C25B 1/04* (2021.01)
*C25B 15/08* (2006.01)
*C25B 15/023* (2021.01)

(52) U.S. Cl.
CPC .............. *C25B 15/031* (2021.01); *C25B 1/04* (2013.01); *C25B 15/023* (2021.01); *C25B 15/08* (2013.01)

(58) Field of Classification Search
CPC .......... C25B 15/031; C25B 15/02; C25B 1/04
See application file for complete search history.

(56) References Cited

FOREIGN PATENT DOCUMENTS

| | | |
|---|---|---|
| JP | 2003-073872 A | 3/2003 |
| JP | 2010-121146 A | 6/2010 |
| JP | 2012-111981 A | 6/2012 |
| JP | 2019-073751 A | 5/2019 |
| JP | 2019-123899 A | 7/2019 |
| KR | 10-1724060 B1 | 4/2017 |

OTHER PUBLICATIONS

WO-2020203857-A1, see translation (Year: 2020).*
S.M. Alia et al., "Activity and Durability of Iridium Nanoparticles in the Oxygen Evolution Reaction", Journal of The Electrochemical Society, 163(11), pp. F3105-F3112 (2016).

* cited by examiner

*Primary Examiner* — Nicholas A Smith
(74) *Attorney, Agent, or Firm* — Fox Rothschild LLP

(57) ABSTRACT

A water electrolysis system includes a water electrolytic stack, a water reservoir connected to the water electrolytic stack to supply water to the water electrolytic stack, a water circulation pump supplying the water in the water reservoir to the electrolytic stack; and a control unit configured to, during an operation stoppage of the electrolysis system, control the driving of the water circulation pump to convert the water in the electrolytic stack from an acidic condition to a neutral condition and to regulate a unit cell voltage of the electrolytic stack to a voltage such that an electrolysis reaction does not occur and a chemical state of an anode catalyst is stably maintained.

26 Claims, 6 Drawing Sheets

WATER ELECTROLYSIS SYSTEM

CROSS REFERENCE TO RELATED APPLICATION

The present application claims under 35 U.S.C. § 119(a) the benefit of Korean Patent Application No. 10-2020-0075496, filed on Jun. 22, 2020, the entire contents of which are incorporated by reference herein.

BACKGROUND

(a) Technical Field

The present disclosure relates to a water electrolysis system, more particularly, to the water electrolysis system in which upon stoppage thereof, the state of an anode catalyst is stably maintained, thereby ensuring continuous performance and a long lifespan of the water electrolysis system while improving durability of the water electrolysis system.

(b) Description of the Related Art

A water electrolysis system using a polymer electrolyte membrane (PEM) is a device that decomposes water into hydrogen and oxygen with an electrochemical reaction. Due to its advantages such as having a high hydrogen production rate, high purity of the generated hydrogen, and flexible operation, the water electrolysis system has been identified as a next-generation technology for securing clean hydrogen.

Moreover, when power supplied to the water electrolysis system for the electrochemical reaction is replaced with eco-friendly renewable energy (e.g., solar energy, wind energy, etc.), hydrogen can be produced utilizing excess power without producing environmental pollution, so the water electrolysis system can maximize utilization of new and renewable energy.

In general, the water electrolysis system using the polymer electrolyte membrane employs a stack for water electrolysis in which a plurality of unit cells is stacked and assembled in order to satisfy the required hydrogen production.

A unit cell of the electrolytic stack includes a Membrane-Electrode Assembly (MEA) composed of a perfluorinated sulfonic acid ionomer-based membrane capable of transferring hydrogen ions (protons), and anode and cathode electrodes stacked on opposite sides of the electrolyte membrane, respectively.

The electrochemical reaction of the water electrolysis system occurs in a membrane-electrode assembly composed of the perfluorinated sulfonic acid ionomer-based electrolyte membrane and anode/cathode electrodes, wherein water supplied to the anode is decomposed into oxygen ions, hydrogen ions (protons), and electrons, the hydrogen ions then move to the cathode, which is a reduction electrode, through the electrolyte membrane, and the electrons move to the cathode through an external circuit and supplied power, whereby hydrogen ions and electrons react with each other at the cathode to produce hydrogen.

At this time, for the electrochemical reaction for the hydrogen production, the anode mainly employs an Ir-based catalyst such as $IrO_2$, and the cathode mainly employs a Pt catalyst.

In the electrochemical reaction of such a water electrolysis system, the open circuit voltage (OCV) is 1.23 V, the operating voltage of the unit cell in the electrochemical reaction is 1.23 V or more; when the electrolysis system is stopped, the voltage of the unit cell decreases to 1.23 V or less, and due to the generation and movement of hydrogen ions, the surroundings of the anode and cathode electrodes become acidic.

On the other hand, when operation of the water electrolysis system is stopped, the correlation of voltage and characteristics of Ir, which is a main component of the anode catalyst, in the acidic condition will be described with reference to the Pourbaix diagram of FIG. 1 (RELATED ART) as follows.

As illustrated in FIG. 1, when operation of the water electrolysis system is stopped, under the condition that the pH of the electrolytic stack is maintained, the operation voltage decreases to the open circuit voltage (OCV) state along a path A, and then further decreases from the open circuit voltage (OCV) state toward 0 V along a path B.

At this time, when the anode and cathode electrodes are in an acidic condition in a state in which the voltage drops, as in the path B, $IrO_2$, which is a main component of the anode catalyst, tends to be in an Ir ion or metal state. This may cause the anode catalyst to be dissolved, or the activity of Oxygen Evolution Reaction (OER) of the electrolytic stack to be reduced, resulting in a reduction in the performance and lifespan of the electrolysis system.

In addition, when the start-up and stoppage of the electrolysis system are repeated, the anode catalyst $IrO_2$ is frequently exposed to an environment wherein it changes to an ionic or metal state, which causes a rapid decrease in performance and lifespan of the electrolytic stack.

Accordingly, the best way to maintain the state of $IrO_2$ as it was when the water electrolysis system is stopped is to continuously apply about 1.23 V per unit cell until the next operation is performed. However, for the electrolytic stack composed of hundreds or more unit cells, a voltage of several hundred V may be formed, which may cause problems in terms of electrical energy efficiency and electrical safety.

Accordingly, there is a need for a water electrolysis system technique capable of, upon stoppage of operation, dropping the voltage of the electrolytic stack to 0 V while maintaining the anode's $IrO_2$ catalyst in a chemically stable state as much as possible.

SUMMARY

Accordingly, an objective of the present disclosure is to provide a high-durability water electrolysis system in which, upon stoppage of the operation, water supplied around electrodes, such as an anode, is converted from acidic pH to neutral pH through water circulation inside a water electrolytic stack, and at the same time, the voltage in the open circuit voltage (OCV) state of the water electrolytic stack remains unchanged, or the voltage of the water electrolytic stack is maintained around the open circuit voltage (OCV) where the state of $IrO_2$ is maintained, the voltage drop toward 0 V is mined out from the point when the water inside the water electrolytic stack became the neutral pH, so that the state of the anode catalyst is stably maintained when the electrolysis system using a polymer electrolytic membrane is stopped, thereby improving the performance, lifespan, and durability of the water electrolysis system.

In order to achieve the above objective, according to one aspect of the present disclosure, there is provided a water electrolysis system including: a water electrolytic stack; a water reservoir connected to the water electrolytic stack to supply water to the water electrolytic stack; a water circulation pump supplying the water in the water reservoir to the electrolytic stack; and a control unit configured to, during an operation stoppage of the electrolysis system, control driving of the water circulation pump to convert the water in the electrolytic stack from an acidic condition to a neutral condition and to regulate a unit cell voltage of the electrolytic stack to a voltage such that an electrolysis reaction does not occur and a chemical state of an anode catalyst is stably maintained.

The water reservoir may be composed of a first water reservoir storing a neutral water from which contaminants have been removed, or the first water reservoir storing the neutral water from which contaminants have been removed and a second water reservoir storing water separated from a gas-liquid separator, wherein an open/close valve is mounted on an outlet line of the second water reservoir.

The water electrolysis system may further include an auxiliary water circulation pump configured to rapidly convert an acidic condition of an interior of the electrolytic stack to a neutral condition during the operation stoppage of the electrolysis system.

The control unit may be configured to, during the operation stoppage of the electrolysis system, adjust the unit cell voltage of the electrolytic stack to a voltage range between an upper limit ($V_1$) and a first lower limit ($V_2$) such that an electrolysis reaction does not occur and a chemical state of an anode catalyst is stably maintained in an acidic state in which the unit cell voltage is a potential of hydrogen (pH) of $K_1$; when the pH of water in the electrolytic stack is determined to be greater than or equal to a reference pH value ($K_2$) for operation stoppage of the electrolysis system, to drop the unit cell voltage of the electrolytic stack to a second lower limit ($V_3$) such that an electrolysis reaction does not occur and a chemical state of an anode catalyst is stably maintained in a state in which the unit cell voltage is the pH of $K_2$; and to adjust the unit cell voltage of the electrolytic stack to 0 V to stop the operation of the water circulation pump to complete the stoppage of the electrolysis system.

The control unit may be configured such that the time (ta) taken to drop the unit cell voltage as $V_1$ to $V_2 \rightarrow V_3$ so that the anode catalyst remains chemically stable without being damaged upon a sudden restart during the operation stoppage of the water electrolysis system is controlled to be greater than the time (tb) taken to drop the unit cell voltage from $V^3$ to 0 V.

When an $IrO_2$ catalyst is used in an anode of the electrolytic stack, the pH of $K_1$ may be set to 3, the upper limit ($V_1$) of the unit cell voltage to 1.23 V, and the first lower limit ($V^2$) of the unit cell voltage to 1.1 V, and the value of $K_2$ is a reference pH value indicating that the water stored in the electrolytic stack exhibits a neutral pH state for stopping the operation of the electrolysis system, wherein when the $IrO_2$ catalyst is used in the anode, the value of $K_2$ may be set to 6 to 7, and the second lower limit ($V_3$) of the unit cell voltage to 0.9 V.

The control unit may include: a controller connected to the electrolytic stack so that a unit cell voltage of the electrolytic stack is able to be measured; a pH sensor measuring a potential of hydrogen (pH) of water in the electrolytic stack and transmitting the measured pH to the controller; a second switch configured to be turned on by the controller when a current needs to be supplied from a power source to the electrolytic stack in the process of stopping the operation of the electrolysis system; a third switch configured to be turned on by the controller when a current needs to be supplied from the power source to the water circulation pump; and a transistor arranged between the second switch and the electrolytic stack.

The control unit may include: a controller connected to the electrolytic stack so that a unit cell voltage of the electrolytic stack is able to be measured; a pH sensor measuring a potential of hydrogen (pH) of water in the electrolytic stack and transmitting the measured pH to the controller; a first switch configured to be turned on and a second switch configured to be kept off by the controller so as to supply a current from a first power source to the electrolytic stack during the operation of the electrolysis system; a third switch configured to be turned on by the controller so as to supply a current from a second power source to the water circulation pump; a fourth switch arranged between the electrolytic stack and the water circulation pump so as to be kept off during the operation of the electrolysis system; and a transistor arranged between the second switch and the power source, wherein during the operation stoppage of the electrolysis system, the second switch is controlled to be turned on by the controller when a current needs to be supplied from the power source to the electrolytic stack, and the fourth switch is controlled to be turned on by the controller when a residual voltage of the electrolytic stack needs to be supplied as an auxiliary power source for driving the water circulation pump.

The control unit may include: a controller connected to the electrolytic stack so that a unit cell voltage of the electrolytic stack is able to be measured; a pH sensor measuring a potential of hydrogen (pH) of water in the electrolytic stack and transmitting the measured pH to the controller; a first switch configured to be turned on by the controller when a current needs to be supplied from a first power source to the electrolytic stack during the operation of the electrolysis system; a second switch configured to be first turned on by the controller when a current needs to be supplied from the first power source to the electrolytic stack during the operation of the electrolysis system and then turned off by the controller in the process of stopping the operation of the electrolysis system; a third switch configured to be turned on by the controller when a current needs to be supplied from a second power source to the water circulation pump; a fourth switch configured to be first turned off during the operation of the electrolysis system and then turned on by the controller when the unit cell voltage of the electrolytic stack is intended to drop to 0 V for stable stoppage of the electrolysis system; and a variable resistor arranged on a line via which a current is supplied from the first power source to the electrolytic stack.

The control unit may include: a controller connected to the electrolytic stack so that a unit cell voltage of the electrolytic stack is able to be measured; a pH sensor measuring a potential of hydrogen (pH) of water in the electrolytic stack and transmitting the measured pH to the controller; a first switch configured to be turned on by the controller when a current needs to be supplied from a first power source to the electrolytic stack during the operation of the electrolysis system; a second switch configured to be first turned on by the controller when a current needs to be supplied from the first power source to the electrolytic stack during the operation of the electrolysis system and then turned off by the controller in the process of stopping the operation of the electrolysis system; a third switch configured to be turned on by the controller when a current needs to be supplied from a second power source to the water circulation pump; a fourth switch configured to be first turned off during the operation of the electrolysis system and then turned on by the controller when the unit cell voltage of the electrolytic stack is intended to drop to 0 V for stable stoppage of the electrolysis system; a first resistor and a second resistor arranged on a line via which a current is supplied from the first power source to the electrolytic stack; a first resistor connection switch configured to be turned on by the controller such that the first resistor is used; and a second resistor connection switch configured to be turned on by the controller such that the second resistor is used.

The present disclosure has the following effects through the above-described configuration.

In the water electrolysis system, upon stoppage of the operation, water supplied around electrodes, such as an anode, is converted from acidic pH to neutral pH through water circulation inside the water electrolytic stack, and at the same time, the voltage in the open circuit voltage (OCV) state of the water electrolytic stack remains unchanged, or the voltage of the water electrolytic stack is maintained around the open circuit voltage (OCV) where the state of $IrO_2$ is maintained, the voltage drop toward 0 V is mined out from the point when the water inside the water electrolytic stack became the neutral pH, so that the state of the anode catalyst is stably maintained when the electrolysis system using the polymer electrolytic membrane is stopped, thereby improving the performance, lifespan, and durability of the water electrolysis system.

BRIEF DESCRIPTION OF THE DRAWINGS

The above and other objectives, features, and advantages of the present disclosure will be more clearly understood from the following detailed description when taken in conjunction with the accompanying drawings, in which.

DETAILED DESCRIPTION OF THE DISCLOSURE

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

The present disclosure provides a water electrolysis system in order to continuously maintain the performance of the electrolysis system while ensuring durability, in which upon stoppage of operation of the electrolysis system, water supplied around electrodes, such as an anode, is converted from acidic pH to neutral pH through water circulation inside a water electrolytic stack, and at the same time, the voltage in the open circuit voltage (OCV) state of the water electrolytic stack remains unchanged, or the voltage of the water electrolytic stack is maintained around the open circuit voltage (OCV) where the state of $IrO_2$ is maintained, the voltage drop toward 0 V is carried out from the point when the water inside the water electrolytic stack became the neutral pH.

Figure 1:
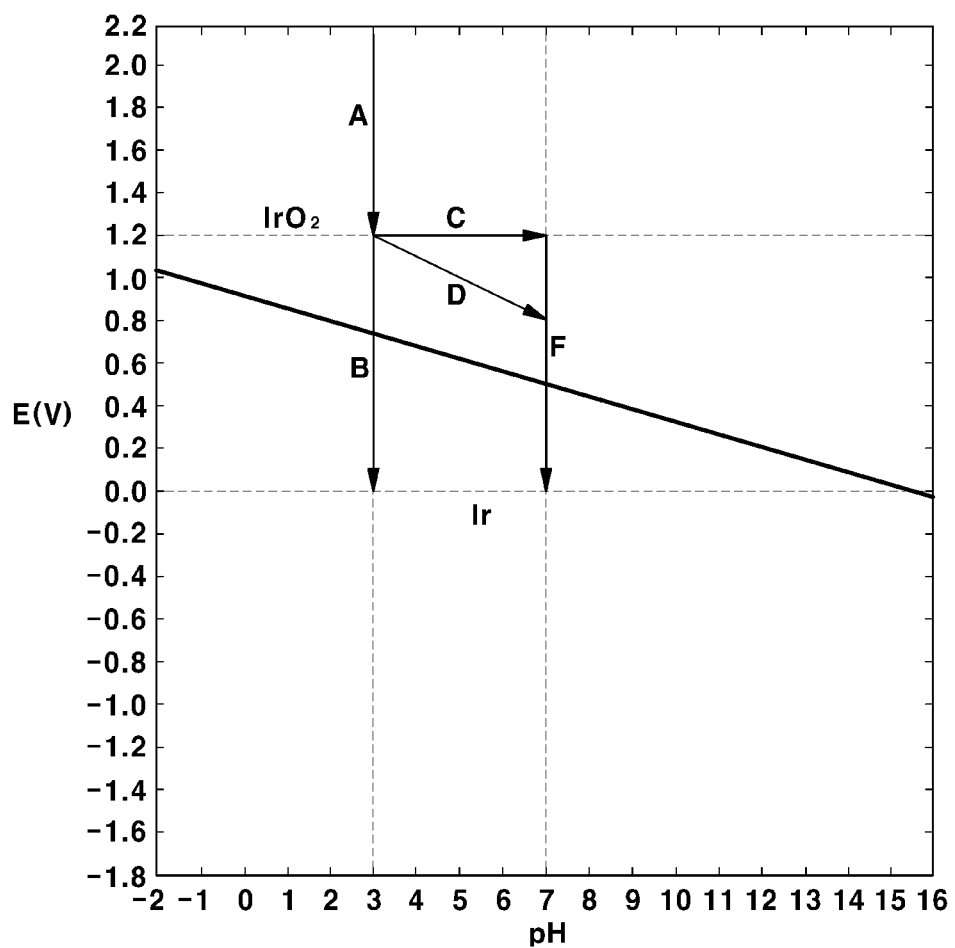
FIG. 1 (RELATED ART) is a Pourbaix diagram illustrating the characteristics of Ir, the main component of an anode catalyst, with respect to a voltage and acidic condition, when a water electrolysis system is stopped.
Figure 2:
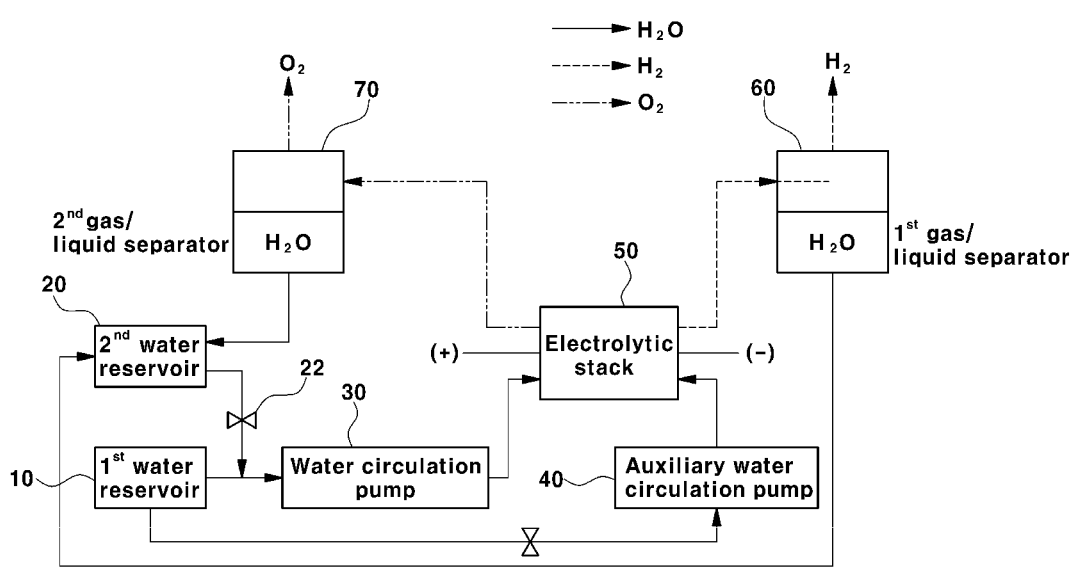
FIG. 2 is a diagram illustrating the configuration of a water electrolysis system according to the present disclosure.

FIG. 2 is a diagram illustrating the configuration of a high-durability water electrolysis system according to the present disclosure, wherein reference numeral 50 indicates a water electrolytic stack of a plurality of unit cells stacked and assembled to meet the required hydrogen production.

As described above, a unit cell (of the plurality of unit cells) of the electrolytic stack 50 includes a Membrane-Electrode Assembly (MEA) composed of a perfluorinated sulfonic acid ionomer-based membrane capable of transferring hydrogen ions (protons), and anode and cathode electrodes stacked on opposite sides of the electrolyte membrane, respectively.

Accordingly, water supplied to the anode is decomposed into oxygen ions, hydrogen ions (protons), and electrons, the hydrogen ions then move to the cathode, a reduction electrode, through the electrolyte membrane, and the electrons move to the cathode through an external circuit and supplied power, whereby hydrogen ions and electrons react with each other at the cathode to produce hydrogen.

A first water reservoir 10 for supplying water is connected to the electrolytic stack 50 via a water circulation pump 30. The first water reservoir 10 may store water in a neutral state from which contaminants have been removed.

Hydrogen produced in the water electrolytic stack 50 flows to a hydrogen collection site via a first gas-liquid separator 60, and oxygen produced in the water electrolytic stack 50 flows to an oxygen collection site via a second gas-liquid separator 70.

At this time, the water mixed with hydrogen is separated from the first gas-liquid separator 60, and the water mixed with oxygen is separated from the second gas-liquid separator 70, and the water separated from respective gas-liquid separators 60 and 70 is collected in a second water reservoir 20.

Accordingly, in addition to the first water reservoir 10, the second water reservoir 20 for storing water separated from respective gas-liquid separators 60 and 70 may also be used as a source for supplying water to the electrolytic stack 50.

A valve 22 may be preferably mounted on an outlet line of the second water reservoir 20, that is, a connection line between the second water reservoir 20 and the water circulation pump 30, wherein the valve 22 is configured such that when the valve is closed, the first water reservoir 10 can be used alone as a source for supplying water to the stack 50, and when the valve is opened, the first water reservoir 10 and the second water reservoir 20 can be used together as a source for supplying water to the stack 50.

In particular, during normal operation of the water electrolysis system, the valve 22 is opened so that the first water reservoir 10 and the second water reservoir are used together as a source for supplying water to the stack 50. On the other hand, when the operation of the water electrolysis system is stopped, the valve 22 is closed so that the first water reservoir 10 in which contaminants-removed neutral water is stored is used alone as a source for supplying water to the stack 50.

Meanwhile, an auxiliary water circulation pump 40 may be further provided to rapidly convert the chemical state in the cells of the electrolyte stack, which exhibits an acidic state, to a neutral state when the operation is stopped.

Figure 3:
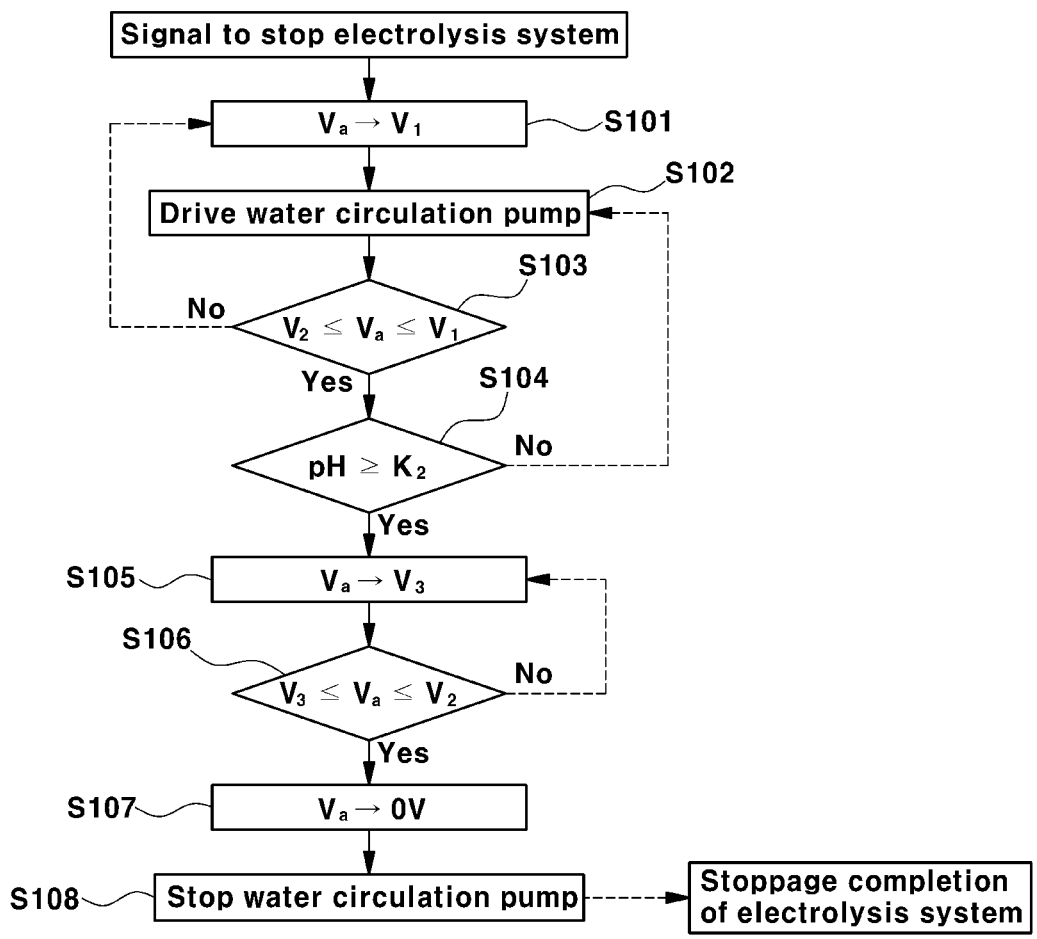
FIG. 3 is a flow chart illustrating the operation stoppage procedure of the electrolysis system according to the present disclosure.

The operation stoppage procedure of the water electrolysis system according to the present disclosure will now be described with reference to the flow chart of FIG. 3.

First, when the operation of the electrolysis system is stopped, the unit cell voltage Va of the electrolysis stack is controlled so as to have an upper limit value V1 of the unit cell voltage at which a water electrolysis reaction does not occur, under the voltage control by a controller to prevent a rapid drop of the unit cell voltage Va of the electrolytic stack (S101).

The unit cell voltage $V_a$ of the electrolytic stack is a voltage that is generated in the unit cell. The unit cell voltage may be a value obtained by dividing the voltage of the electrolytic stack by the number of unit cells or averaging the measured voltages of respective unit cells.

The upper limit value $V_1$ of the unit cell voltage is set to a voltage such that the electrolysis reaction does not occur in the acidic condition (pH $K_1$) and the state of an anode catalyst is stably maintained.

Next, the controller controls the water circulation pump 30 to operate continuously in order to convert the water electrolytic stack 50 from an acidic condition to a neutral condition (S102).

Accordingly, the contaminants-removed neutral state water, which was stored in the first water storage 10, is supplied to the electrolytic stack 50, serving to convert the electrolytic stack 50 from the acidic condition to the neutral condition.

Subsequently, the unit cell voltage Va of the electrolytic stack is controlled to have a voltage range between the upper limit $V_1$ and the first lower limit $V_2$ of the unit cell voltage under the voltage control by the controller such that the electrolysis reaction does not occur and the chemical state of the anode catalyst is stably maintained in an acidic state that is pH $K_1$.

At this time, the controller checks whether or not the unit cell voltage Va of the electrolytic stack is adjusted to a voltage range ($V_2 \leq V_a \leq V_1$) between the upper limit $V_1$ and the first lower limit $V_2$ of the unit cell voltage, on the basis of the measurement signal of a voltage measurement sensor mounted on the electrolytic stack (S103).

The first lower limit $V_2$ of the unit cell voltage is a voltage set such that the electrolytic reaction does not occur and the chemical state of the anode catalyst is stably maintained in the acidic condition (pH $K_1$).

For example, when an $IrO_2$ catalyst is used in the anode of the electrolytic stack, the pH $K_1$ may be set to 3, the upper limit $V_1$ of the unit cell voltage to 1.23 V, and the first lower limit $V_2$ of the unit cell voltage to 1.1 V.

Next, when the unit cell voltage Va of the electrolytic stack is checked so as to be a range ($V_2 \leq V_a \leq V_1$) between the upper limit $V_1$ and the first lower limit $V_2$ of the unit cell voltage, the controller determines whether or not a potential of hydrogen (pH) of the water present in the electrolytic stack is greater than or equal to a reference pH value $K_2$ for stopping the operation of the water electrolysis system (S104).

For example, when a pH sensor mounted on the water electrolytic stack measures the pH of water present in the electrolytic stack and transmits the measurements to the controller, the controller compares the measured pH with the reference pH value for stopping the operation of the water electrolysis system, and determines whether or not the measured pH is greater than or equal to the reference pH value $K_2$.

Subsequently, when the water pH, which is an important factor for stopping the operation of the water electrolysis system, is determined to be greater than or equal to the reference pH value $K_2$ for stopping the operation of the water electrolysis system, the unit cell voltage $V_a$ of the stack is adjusted to drop to a second lower limit $V_3$ of the unit cell voltage under the voltage control by the controller such that the electrolysis reaction does not occur and the anode catalyst is chemically stably maintained at pH $K_2$ (S105).

At this time, $K_2$ is a reference pH value indicating that the water present in the electrolytic stack exhibits a neutral pH state for stopping the operation of the electrolysis system. When the $IrO_2$ catalyst is used in the anode, $K_2$ may be set to 6 to 7, and the second lower limit $V_3$ of the unit cell voltage to 0.9 V.

Subsequently, it is checked whether or not the unit cell voltage Va of the electrolytic stack is adjusted to drop to the second lower limit $V_3$ of the unit cell voltage in the step S105 so that the electrolysis reaction does not occur and the anode catalyst is chemically stably maintained at pH $K_2$ (S106).

For example, when the unit cell voltage Va of the electrolytic stack is checked to have a range ($V_3 \leq V_a \leq V_2$) between the first lower limit $V_2$ and the second lower limit $V_3$ of the unit cell voltage, it can be determined that the unit cell voltage Va of the electrolytic stack is adjusted to drop toward the second lower limit $V_3$ of the unit cell voltage so that the electrolysis reaction does not occur and the anode catalyst is chemically stably maintained at pH $K_2$.

As described above, the reason why the unit cell voltage of the water electrolytic stack is not simply decreased as $V_1$ to $V_2 \to 0$ V, but is sequentially decreased in the order of $V_1$ to $V_2 \to V_3 \to 0$ V is that the unit cell voltage is maintained in a voltage region that enables the anode catalyst to be chemically stably maintained during the stoppage of the operation so that the anode catalyst can be maintained in a chemically stable state without being damaged upon sudden restart in the operation stoppage stage of the electrolysis system.

Finally, through the processes of controlling the unit cell voltage $V_a$ to 0 V (S107) and of stopping the water circulation pump (S108), the water electrolysis system for maintaining the anode catalyst in a chemically stable state is completely stopped.

On the other hand, the time to taken to drop as $V_1$ to $V_2 \to V_3$ so that the anode catalyst remains chemically stable without being damaged upon a sudden restart during the stoppage of the operation of the water electrolysis system is preferably controlled to be greater than the time tb taken to drop from $V_3$ to 0 V.

Here, the various embodiments associated with the method of controlling the driving of the water circulation pump and the method of controlling the unit cell voltage of the water electrolytic stack during the operation stoppage of the water electrolysis system according to the present disclosure will be described as follows.

FIRST EMBODIMENT

Figure 4:
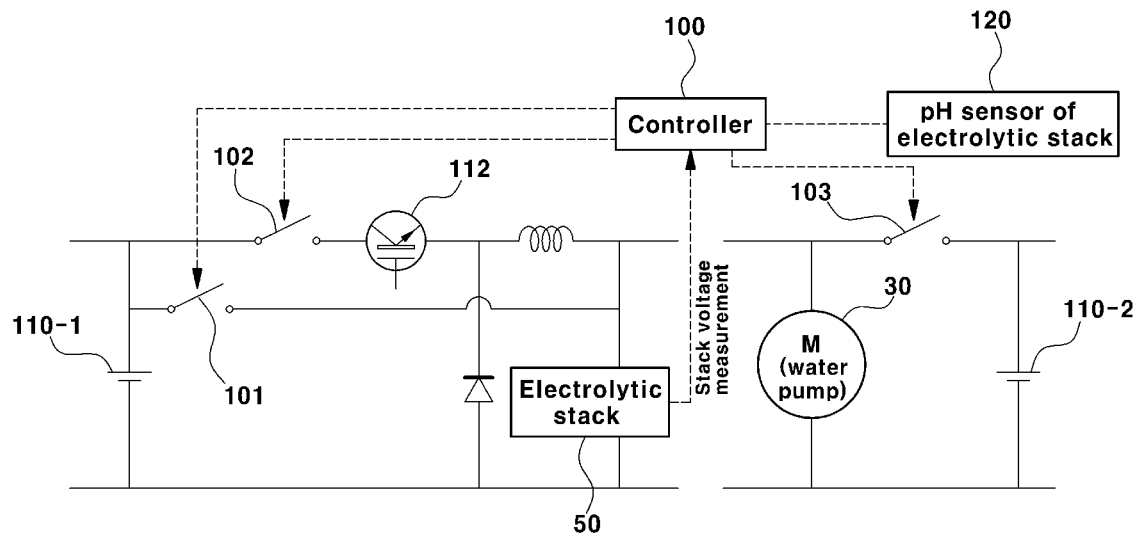
FIG. 4 is a configuration diagram illustrating the voltage control during the operation stoppage procedure of the water electrolysis system according to a first embodiment of the present disclosure.

FIG. 4 is a circuit diagram for controlling the unit cell voltage of the electrolytic stack and the driving of the water circulation pump according to the first embodiment of the present disclosure, wherein upon the stoppage of the operation of the water electrolysis system, water supplied around electrodes, such as an anode, is converted from acidic pH to neutral pH through water circulation inside the water electrolytic stack, and at the same time, the unit call voltage of the water electrolytic stack is adjusted to a range such that the anode catalyst can be chemically stably maintained, and then the voltage drop toward 0 V is carried out from the point when the water in the water electrolytic stack became the neutral pH.

As illustrated in FIG. 4, a controller 100 is connected to the electrolytic stack 50 for voltage measurement.

In addition, a potential of hydrogen (pH) sensor 120 is connected to the controller 100 to measure a pH of water in the electrolytic stack 50.

In addition, as a switch that is controlled on/off by the controller 100, the electrolysis system includes a first switch 101 that is turned on when a current needs to be supplied from a first power source 110-1 to the electrolytic stack 50 during operation of the electrolysis system, a second switch 102 that is turned on when a current needs to be supplied from the first power source 110-1 to the electrolytic stack 50 in the process of operation stoppage of the electrolysis system, and a third switch 103 that is turned on when a current needs to be supplied from a second power source 110-2 to the water circulation pump 30.

In addition, as a means for adjusting the voltage supplied from the first power source 110-1 to the electrolytic stack during the operation stoppage of the electrolysis system, the electrolysis system includes a transistor 112 arranged between the second switch 102 and the electrolytic stack 50.

According to the first embodiment of the present disclosure, in order to adjust the unit cell voltage of the electrolytic stack during the operation stoppage of the electrolysis system as $V_1 \sim V_2 \to V_3 \to 0$ V, a stepwise pulse width modulation (PWM) voltage control may be performed on the electrolytic stack.

To this end, the first switch 101 is turned off, the second switch 102 is turned on, and the third switch 103 is also kept on by the signal of the controller during the operation stoppage stage of the electrolysis system.

Therefore, the water circulation pump 30 is continuously operated in order to convert the electrolytic stack 50 from an acidic condition to a neutral condition.

That is, the water of neutral pH state in which the contaminants stored in the first water storage 10 is removed is supplied to the electrolytic stack 50 by the operation of the water circulation pump 30, so that the water electrolytic stack 50 is converted from the acidic condition to the neutral condition.

Subsequently, the unit cell voltage $V_a$ of the electrolytic stack is adjusted to have a range between the upper limit $V_1$ and the first lower limit $V_2$ of the unit cell voltage such that the electrolysis reaction does not occur and the chemical state of the anode catalyst is stably maintained in an acidic state in which the unit cell voltage is pH $K_1$.

That is, the voltage from the power source 110 is regulated in the transistor 112 via the second switch 102, so that the unit cell voltage $V_a$ of the electrolytic stack may be adjusted to have a range between the upper limit $V_1$ and the first lower limit $V_2$ of the unit cell voltage such that the electrolysis reaction does not occur and the chemical state of the anode catalyst is stably maintained in an acidic state in which the unit cell voltage is pH $K_1$.

For example, when an $IrO_2$ catalyst is used in the anode of the electrolytic stack, the pH K1 may be adjusted to 3, the upper limit $V_1$ of the unit cell voltage to 1.23 V, and the first lower limit $V_2$ of the unit cell voltage to 1.1 V.

At this time, a signal indicating a pH of water provided in the water electrolytic stack, which is measured by the pH sensor 120, is transmitted to the controller 100.

Subsequently, when the controller 100 determines that the pH of water, which is an important factor for stopping the operation of the water electrolysis system, is equal to or greater than a reference value $K_2$ for stopping the operation of the water electrolysis system, the controller 100 controls the unit cell voltage $V_a$ of the electrolytic stack to drop to the second lower limit $V_3$ such that the electrolysis reaction does not occur and the chemical state of the anode catalyst is stably maintained in a state in which the unit cell voltage is pH $K_2$, by performing a kind of PWM voltage control (see FIG. 5) to turn on/off the second switch 102 at a predetermined cycle.

$K_2$ is a reference pH value indicating that the water present in the electrolytic stack exhibits a neutral pH state for stopping the operation of the electrolysis system. When the $IrO_2$ catalyst is used in the anode, $K_2$ may be set to 6 to 7, and the second lower limit $V_3$ of the unit cell voltage to 0.9 V.

As described before, the reason why the unit cell voltage of the water electrolytic stack is not simply decreased as $V_1$ to $V_2 \to 0$ V, but is sequentially decreased in the order of $V_1$ to $V_2 \to V_3 \to 0$ V is that the unit cell voltage is allowed to be maintained in a voltage region that enables the anode catalyst to be chemically stably maintained during the stoppage of the operation so that the anode catalyst can be maintained in a chemically stable state without being damaged upon sudden restart in the operation stoppage stage of the electrolysis system.

Finally, through the processes of controlling the unit cell voltage $V_a$ to 0 V and of stopping the water circulation pump, the water electrolysis system for maintaining the anode catalyst in a chemically stable state is completely stopped.

On the other hand, the time to taken to drop as $V_1$ to $V_2 \rightarrow V_3$ so that the anode catalyst remains chemically stable without being damaged upon a sudden restart during the operation stoppage of the water electrolysis system is preferably controlled to be greater than the time tb taken to drop from $V_3$ to 0 V.

Figure 5:
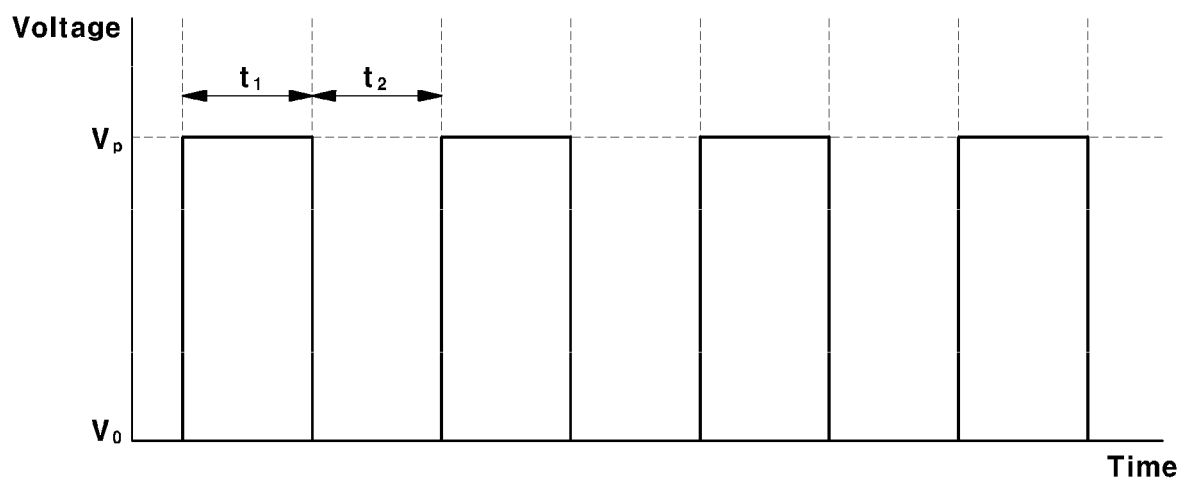
FIG. 5 is a configuration diagram illustrating the voltage control during the operation stoppage procedure of the water electrolysis system according to a second embodiment of the present disclosure.

According to the first embodiment as described above, in order to apply the unit cell voltage of the electrolytic stack in the order of $V_1 \sim V_2 \rightarrow V_3 \rightarrow 0$ V, as illustrated in FIG. 5, the unit cell voltage can be controlled to drop to a desired voltage level by regulating the duty ratio of the duration time t1 in which the voltage $V_p$ is applied and the duration time in which the voltage $V_p$ is not applied.

For example, the voltage applied to the electrolytic stack is $V_p \times (t1/(t1+t2))$, so when t2=0, the applied voltage is $V_p$, and when t1:t2=1:1, the applied voltage is $V_p/2$.

As described before, according to the circuit configuration of the first embodiment, upon the operation stoppage of the electrolysis system, water supplied around electrodes, such as an anode, is converted from acidic pH to neutral pH through water circulation inside the water electrolytic stack, and at the same time, the unit cell voltage of the electrolytic stack is regulated in the order of $V_1 \sim V_2 \rightarrow V_3 \rightarrow 0$ V so that the chemical state of the anode catalyst is stably maintained, thereby improving the performance, lifespan, and durability of the water electrolysis system.

SECOND EMBODIMENT

Figure 6:
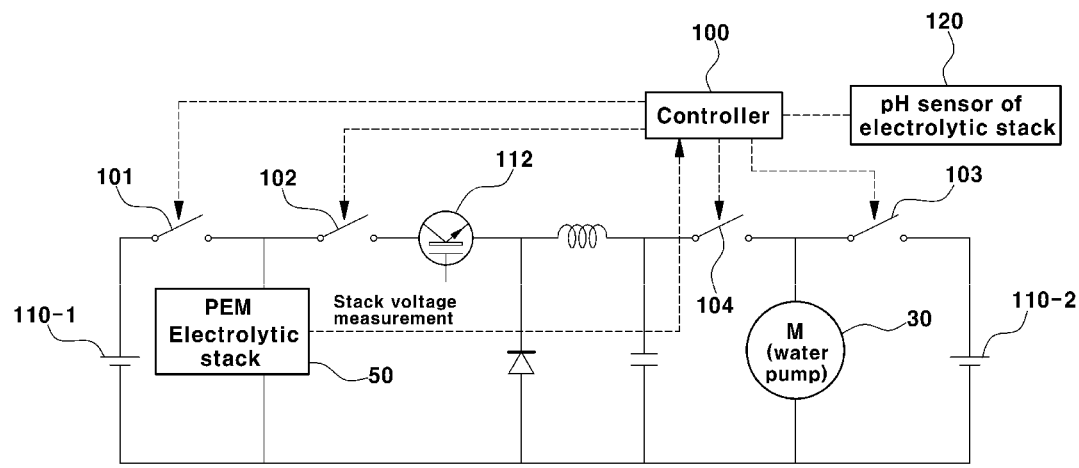
FIG. 6 is a configuration diagram illustrating the voltage control during the operation stoppage procedure of the water electrolysis system according to a third embodiment of the present disclosure.

FIG. 6 is a circuit diagram for controlling the unit cell voltage of the electrolytic stack and the driving of the water circulation pump according to the second embodiment of the present disclosure, wherein upon the operation stoppage of the water electrolysis system, water supplied around electrodes, such as an anode, is converted from acidic pH to neutral pH through water circulation inside the water electrolytic stack by using the residual voltage in the electrolytic stack as an auxiliary power source, and at the same time, the unit call voltage of the water electrolytic stack is adjusted to a range such that the anode catalyst can be chemically stably maintained, and then the voltage drop toward 0 V is carried out from the point when the water in the water electrolytic stack became the neutral pH.

As illustrated in FIG. 6, a controller 100 is connected to the electrolytic stack 50 for voltage measurement.

In addition, a potential of hydrogen (pH) sensor 120 is connected to the controller 100 to measure a pH of water in the electrolytic stack 50.

In addition, as a switch that is controlled on/off by the controller 100, the electrolysis system includes a first switch 101 that is turned on so that a current is supplied from a first power source 110-1 to the electrolytic stack 50 during operation of the electrolysis system, a second switch 102 that is kept in an off state, a third switch 103 that is turned on so that a current is supplied from a second power source 110-2 to the water circulation pump 30, and a fourth switch 104 that is arranged between the second switch 102 and the third switch 103 in the line between the electrolytic stack 50 and the water circulation pump 30 so as to be kept in an off state during the operation of the electrolysis system.

On the other hand, when the operation of the electrolysis system is stopped, the first switch 101 is controlled to be turned off and the second switch 102 to be turned on, and the third switch 103 is controlled to be turned off and the fourth switch 104 is simultaneously turned off.

However, when driving the water circulation pump 30 with the residual voltage of the water electrolytic stack 50, if the residual voltage of the water electrolytic stack 50 is insufficient to drive the water circulation pump 30 or if the voltage of the electrolytic stack 50 deviates from the set voltage, the third switch 103 is controlled to be turned from on to off to supply a current from the second power source 110-2 to the water circulation pump 30, thereby allowing the water circulation pump 30 to be continuously operated.

At this time, the first power source 110-1 is adopted for the operation of the electrolytic stack 50, the second power source 110-2 is adopted for driving the water circulation pump 30, and the second switch 102, the fourth switch 104, and the transistor 112 arranged between the second switch 102 and the fourth switch 104 are adopted to drive the water circulation pump 30 with the residual voltage of the electrolytic stack 50.

According to the second embodiment of the present disclosure, in order to adjust the unit cell voltage of the electrolytic stack during the operation stoppage of the electrolysis system as $V_1 \sim V_2 \rightarrow V_3 \rightarrow 0$ V, the electrolysis system may be operated such that the first switch 101 is turned off, the second switch 102 is turned on, the fourth switch 104 is turned on, and the third switch 103 is turned off, or kept on by the signal of the controller during the operation stoppage stage of the electrolysis system.

Therefore, the water circulation pump 30 is continuously operated in order to convert the electrolytic stack 50 from an acidic condition to a neutral condition. Here, since the fourth switch 104 is in the on-state, the water circulation pump 30 may be driven by using the residual voltage in the electrolytic stack 50 as an auxiliary power source.

Then, the contaminants-removed water stored in the first water storage 10 is supplied to the electrolytic stack 50 by the operation of the water circulation pump 30, so that the water electrolytic stack 50 is converted from the acidic condition to the neutral condition.

As described above, according to the second embodiment of the present disclosure, the residual voltage in the electrolytic stack 50 is used as an auxiliary power source for driving the water circulation pump 30, so that the unit cell voltage of the electrolytic stack is gradually consumed and sequentially reduced as $V_1$ to $V_2 \rightarrow V_3 \rightarrow 0$ V.

An unintended voltage may be formed in the electrolytic stack in an early stage of the operation stoppage of the water electrolysis system due to the effects of hydrogen and oxygen remaining in the water electrolytic stack. Accordingly, with the voltage control of the transistor 112, the unit cell voltage Va of the electrolytic stack may be adjusted to have a range between the upper limit $V_1$ and the first lower limit $V_2$ of the unit cell voltage such that the electrolysis reaction does not occur and the chemical state of the anode catalyst is stably maintained in an acidic state in which the unit cell voltage is pH $K_1$.

For example, when an $IrO_2$ catalyst is used in the anode of the electrolytic stack, the pH $K_1$ may be adjusted to 3, the upper limit $V_1$ of the unit cell voltage to 1.23 V, and the first lower limit $V_2$ of the unit cell voltage to 1.1 V.

Thereafter, when the pH value in the electrolytic stack is equal to or greater than the reference value $K_2$ for stopping the operation of the electrolysis system, the water circulation pump 30 is further driven by using the residual voltage in the electrolytic stack as an auxiliary power so that the unit cell voltage $V_a$ of the electrolytic stack may be adjusted to have the second lower limit $V_3$ such that the electrolysis reaction does not occur and the chemical state of the anode catalyst is stably maintained in a state in which the unit cell voltage is pH $K_2$.

For example, when an $IrO_2$ catalyst is used for the anode, $K_2$ is set to 6 to 7, and the second lower limit $V_3$ of the unit cell voltage is formed to be 0.9 V.

Subsequently, when the unit cell voltage is adjusted to drop to the second lower limit $V_3$, the auxiliary power source function of the water circulation pump is performed until the residual voltage of the electrolytic stack becomes 0 V, and the stoppage of the water electrolysis system is completed.

That is, after the unit cell voltage $V_a$ of the electrolytic stack becomes the second lower limit $V_3$, the auxiliary power source function of the water circulation pump is performed until the residual voltage of the electrolytic stack becomes 0 V for stable stoppage of the electrolysis system, so the water circulation pump 30 is stopped and finally, the chemical state of the anode catalyst is maintained in a stable state and the operation of the water electrolysis system is stopped.

On the other hand, the time to taken to drop as $V_1$ to $V_2 \rightarrow V_3$ so that the anode catalyst remains chemically stable without being damaged upon a sudden restart during the operation stoppage of the water electrolysis system is preferably controlled to be greater than the time tb taken to drop from $V_3$ to 0 V.

As described above, based on the circuit configuration according to the second embodiment of the present disclosure, when the operation of the water electrolysis system is stopped, the water circulation pump 30 is driven by using the residual voltage in the water electrolytic stack 50 as an auxiliary power source, so that water supplied around the electrodes, such as an anode, can be converted from the acidic condition to the neutral condition through the water circulation inside the water electrolytic stack, and at the same time, the residual voltage in the electrolytic stack 50 is continuously used as the auxiliary power source for driving the water circulation pump 30 so that the unit cell voltage of the electrolytic stack is gradually consumed and reduced as $V_1 \sim V_2 \rightarrow V_3 \rightarrow 0$ V to maintain the anode catalyst in a chemically stable state, thereby improving the performance, lifespan, and durability of the water electrolysis system.

THIRD EMBODIMENT

Figure 7:
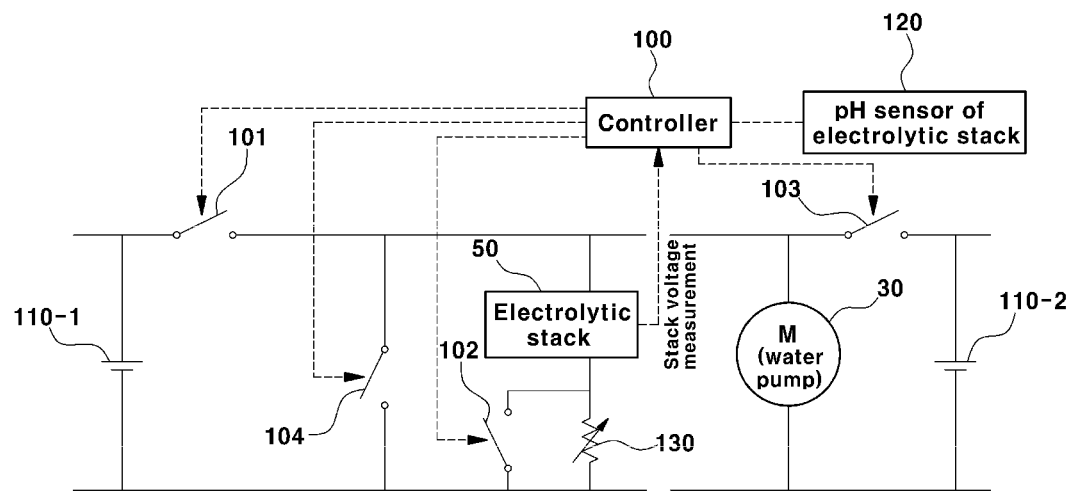
FIG. 7 is a configuration diagram illustrating the voltage control during the operation stoppage procedure of the water electrolysis system according to a fourth embodiment of the present disclosure.

FIG. 7 is a circuit diagram for controlling the unit cell voltage of the electrolytic stack and the driving of the water circulation pump according to the third embodiment of the present disclosure, wherein upon the operation stoppage of the water electrolysis system, water supplied around electrodes, such as an anode, is converted from acidic pH to neutral pH through water circulation inside the water electrolytic stack, and at the same time, the unit call voltage of the water electrolytic stack is adjusted to a range such that the anode catalyst can be chemically stably maintained, using a variable resistor, and then the voltage drop toward 0 V is carried out from the point when the water in the water electrolytic stack became the neutral pH.

To this end, the water electrolytic stack needs to be a neutral condition by the water circulation pump, and the unit cell voltage of the electrolytic stack needs to be regulated as $V_1$ to $V_2 \rightarrow V_3 \rightarrow 0$ V, and accordingly, the third embodiment of the present disclosure is characteristically implemented such that the variable resistor is configured in series in the electrolytic stack to achieve step-by-step voltage control in order to regulate the unit cell voltage of the electrolytic stack as $V_1$ to $V_2 \rightarrow V_3 \rightarrow 0$ V during the operation stoppage of the electrolysis system.

As illustrated in FIG. 7, a controller 100 is connected to the electrolytic stack 50 for voltage measurement.

In addition, a potential of hydrogen (pH) sensor 120 is connected to the controller 100 to measure a pH of water in the electrolytic stack 50.

In addition, as a switch that is controlled on/off by the controller 100, the electrolysis system includes a first switch 101 that is turned on when a current needs to be supplied from a first power source 110-1 to the electrolytic stack during operation of the electrolysis system, a second switch 102 that is turned on when a current needs to be supplied from the first power source 110-1 to the electrolytic stack 50 and is turned off in the process of operation stoppage of the electrolysis system, a third switch 103 that is turned on when a current needs to be supplied from a second power source 110-2 to the water circulation pump 30, and a fourth switch 104 that is turned off during the operation of the electrolysis system and turned on when the unit cell voltage of the water electrolytic stack is intended to be adjusted to 0 V for stable stoppage of the water electrolysis system.

In particular, a variable resistor 130 for voltage regulation is arranged in series on a line via which a current is supplied from the power source 110 to the electrolytic stack during the operation of the electrolysis system.

According to the third embodiment of the present disclosure, in order to adjust the unit cell voltage of the electrolytic stack during the operation stoppage of the electrolysis system as $V_1 \sim V_2 \rightarrow V_3 \rightarrow 0$ V, the first switch 101 is kept on, the second switch 102 is turned off, and the third switch 103 is turned on, and the fourth switch 104 is first kept off by the signal of the controller 100 during the operation stoppage stage of the electrolysis system.

Therefore, the water circulation pump 30 is continuously operated in order to convert the electrolytic stack 50 from an acidic condition to a neutral condition.

That is, the water of neutral pH state in which the contaminants stored in the first water storage 10 is removed is supplied to the electrolytic stack 50 by the operation of the water circulation pump 30, so that the water electrolytic stack 50 is converted from the acidic condition to the neutral condition.

In the early stage of the operation stoppage of the water electrolysis system, due to the effects of hydrogen and oxygen remaining in the water electrolytic stack, the unit cell voltage Va of the electrolytic stack may be adjusted to have a range between the upper limit $V_1$ and the first lower limit $V_2$ of the unit cell voltage such that the electrolysis reaction does not occur and the chemical state of the anode catalyst is stably maintained in an acidic state in which the unit cell voltage is pH $K_1$.

For example, when an $IrO_2$ catalyst is used in the anode of the electrolytic stack, the pH $K_1$ may be adjusted to 3, the upper limit $V_1$ of the unit cell voltage to 1.23 V, and the first lower limit $V_2$ of the unit cell voltage to 1.1 V.

At this time, the variable resistor 130 is arranged in series on the line via which a current is supplied from the power source 110 to the electrolytic stack, so that the unit cell voltage of the electrolytic stack can be controlled in the order of $V_1 \sim V_2 \rightarrow V_3 \rightarrow 0$ V by the operation of the variable resistor during the operation stoppage of the electrolysis system.

Thereafter, when the pH value in the electrolytic stack is equal to or greater than the reference value $K_2$ for stopping the operation of the electrolysis system, with the operation of the variable resistor 130, the unit cell voltage $V_a$ of the electrolytic stack may be adjusted to have the second lower limit $V_3$ such that the electrolysis reaction does not occur and the chemical state of the anode catalyst is stably maintained in a state in which the unit cell voltage is pH $K_2$.

For example, when an IrO2 catalyst is used for the anode, $K_2$ is set to 6 to 7, and the second lower limit $V_3$ of the unit cell voltage is formed to be 0.9 V.

Subsequently, when the unit cell voltage is adjusted to drop to the second lower limit $V_3$, the unit cell voltage of the electrolytic stack drops to 0 V for stable stoppage of the electrolysis system with the operation of the variable resistor 130, and the water circulation pump is stopped by the controller, so that the operation of the water electrolysis system for maintaining the anode catalyst in a chemically stable state is stopped.

Preferably, the controller further controls the first switch 101 and the second switch 102 to be turned off, and the fourth switch 104 to be turned on as well so that the residual voltage of the unit cell voltage of the electrolytic stack is removed by the variable resistor 130, thereby allowing the unit cell voltage Va of the electrolytic stack 50 to be adjusted to 0 V more easily.

On the other hand, the time to taken to drop as $V_1$ to $V_2 \rightarrow V_3$ so that the anode catalyst remains chemically stable without being damaged upon a sudden restart during the operation stoppage of the water electrolysis system is preferably controlled to be greater than the time tb taken to drop from V3 to 0 V.

To this end, the resistance value Ri of the variable resistor when the unit cell voltage drops as $V_1$ to $V_2 \rightarrow V_3$ is used to be greater than the resistance value of the variable resistor when the unit cell voltage drops as $V_3 \rightarrow 0$ V.

As described above, based on the circuit configuration according to the third embodiment of the present disclosure, when the operation of the water electrolysis system is stopped, the water circulation pump 30 is driven so that water supplied around the electrodes, such as an anode, can be converted from the acidic condition to the neutral condition through the water circulation inside the water electrolytic stack, and at the same time, with the operation of the variable resistor 130, the unit cell voltage in the electrolytic stack is sequentially regulated as $V_1 \sim V_2 \rightarrow V_3 \rightarrow 0$ V to maintain the anode catalyst in a chemically stable state, thereby improving the performance, lifespan, and durability of the water electrolysis system.

FOURTH EMBODIMENT

Figure 8:
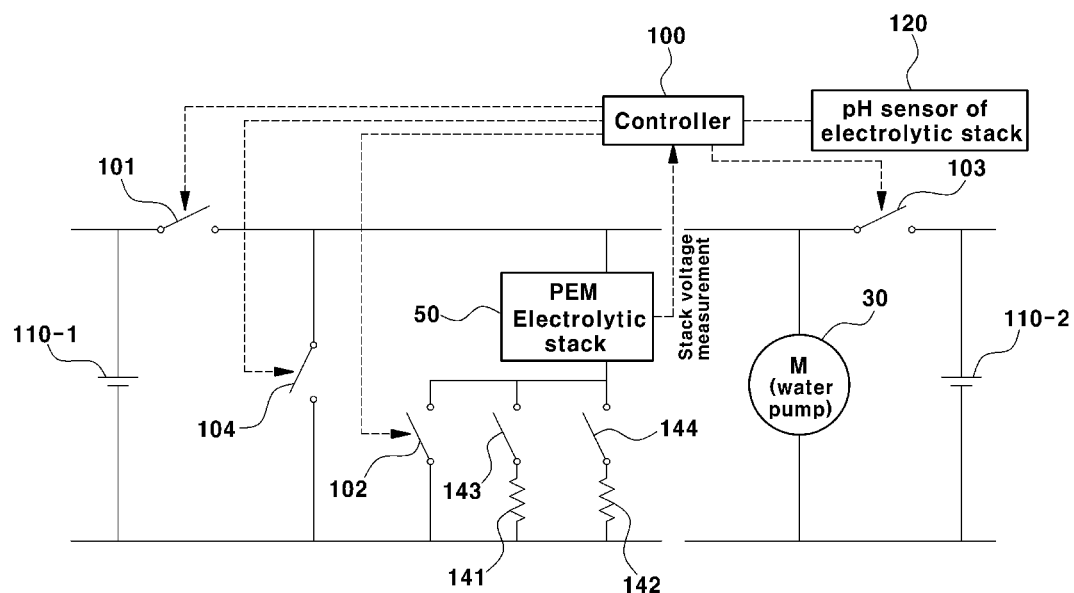
FIG. 8 is a configuration diagram illustrating the voltage control during the operation stoppage procedure of the water electrolysis system according to a fifth embodiment of the present disclosure.

FIG. 8 is a circuit diagram for controlling the unit cell voltage of the electrolytic stack and the driving of the water circulation pump according to the fourth embodiment of the present disclosure, wherein upon the operation stoppage of the water electrolysis system, water supplied around electrodes, such as an anode, is converted from acidic pH to neutral pH through water circulation inside the water electrolytic stack, and at the same time, the unit call voltage of the water electrolytic stack is adjusted to a range such that the anode catalyst can be chemically stably maintained, using a pair of resistors, and then the voltage drop toward 0 V is carried out from the point when the water in the water electrolytic stack became the neutral pH.

As illustrated in FIG. 8, a controller 100 is connected to the electrolytic stack 50 for voltage measurement.

In addition, a potential of hydrogen (pH) sensor 120 is connected to the controller 100 to measure a pH of water in the electrolytic stack 50.

In addition, as a switch that is controlled on/off by the controller 100, the electrolysis system includes a first switch 101 that is turned on when a current needs to be supplied from a first power source 110-1 to the electrolytic stack during operation of the electrolysis system, a second switch 102 that is turned on when a current needs to be supplied from the first power source 110-1 to the electrolytic stack 50 and is turned off in the process of operation stoppage of the electrolysis system, a third switch 103 that is turned on when a current needs to be supplied from a second power source 110-2 to the water circulation pump 30, and a fourth switch 104 that is turned off during the operation of the electrolysis system and turned on when the unit cell voltage of the water electrolytic stack is intended to be adjusted to 0 V for stable stoppage of the water electrolysis system.

In particular, first and second variable resistors 141 and 142 for voltage regulation are arranged in series on a line via which a current is supplied from the power source 110 to the electrolytic stack during the operation of the electrolysis system.

According to the fourth embodiment of the present disclosure, in order to adjust the unit cell voltage of the electrolytic stack during the operation stoppage of the electrolysis system as $V_1 \sim V_2 \rightarrow V_3 \rightarrow 0$ V, the first switch 101 is kept on, the second switch 102 is turned off, and the third switch 103 is turned on, and the fourth switch 104 is first kept off by the signal of the controller 100 during the operation stoppage stage of the electrolysis system.

At this time, either a first resistor connection switch 143 for the first resistor 141 or a second resistor connection switch 144 for the second resistor 142, as described later, is controlled to be turned on so as to induce appropriate voltage drop using the resistors.

Therefore, the water circulation pump 30 is continuously operated in order to convert the electrolytic stack 50 from an acidic condition to a neutral condition.

That is, the water of neutral pH state in which the contaminants stored in the first water storage 10 is removed is supplied to the electrolytic stack 50 by the operation of the water circulation pump 30, so that the water electrolytic stack 50 is converted from the acidic condition to the neutral condition.

In the early stage of the operation stoppage of the water electrolysis system, due to the effects of hydrogen and oxygen remaining in the water electrolytic stack, the unit cell voltage $V_a$ of the electrolytic stack may be adjusted to have a range between the upper limit $V_1$ and the first lower limit $V_2$ of the unit cell voltage such that the electrolysis reaction does not occur and the chemical state of the anode catalyst is stably maintained in an acidic state in which the unit cell voltage is pH $K_1$.

For example, when an $IrO_2$ catalyst is used in the anode of the electrolytic stack, the pH $K_1$ may be adjusted to 3, the upper limit $V_1$ of the unit cell voltage to 1.23 V, and the first lower limit $V_2$ of the unit cell voltage to 1.1 V.

At this time, the first and second resistors 141 and 142 are arranged in series on the line via which a current is supplied from the power source 110 to the electrolytic stack, so that the unit cell voltage of the electrolytic stack can be controlled in the order of $V_1 \sim V_2 \rightarrow V_3 \rightarrow 0$ V by the operation of the resistors during the operation stoppage of the electrolysis system.

To this end, the first resistor connection switch 143 for the first resistor 141 is first controlled to be turned on by the controller 100.

Then, when the pH value in the electrolytic stack is equal to or greater than the reference value $K_2$ for stopping the operation of the electrolysis system, with the operation of the first resistor 141, the unit cell voltage $V_a$ of the electrolytic stack may be adjusted to have the second lower limit V3 such that the electrolysis reaction does not occur and the chemical state of the anode catalyst is stably maintained in a state in which the unit cell voltage is pH $K_2$.

For example, when an $IrO_2$ catalyst is used for the anode, $K_2$ is set to 6 to 7, and the second lower limit $V_3$ of the unit cell voltage is formed to be 0.9 V.

Subsequently, when the unit cell voltage is adjusted to drop to the second lower limit $V_3$, the second resistor connection switch 144 for the second resistor 142 is also controlled to be turned on by the controller 100 such that the unit cell voltage of the water electrolytic stack drops to 0 V for stable stoppage of the water electrolysis system.

Thus, the unit cell voltage of the electrolytic stack drops to 0 V for stable stoppage of the electrolysis system with the operation of the second resistor 142, and the water circulation pump is stopped by the controller, so that the operation of the water electrolysis system for maintaining the anode catalyst in a chemically stable state is stopped.

Preferably, the controller further controls the first switch 101 and the second switch 102 to be turned off, and the fourth switch 104 to be turned on as well so that the residual voltage of the unit cell voltage of the electrolytic stack is removed by the first resistor 141 and/or the second resistor 142, thereby allowing the unit cell voltage $V_a$ of the electrolytic stack 50 to be adjusted to 0 V more easily.

On the other hand, the time to taken to drop as $V_1$ to $V_2 \rightarrow V_3$ so that the anode catalyst remains chemically stable without being damaged upon a sudden restart during the operation stoppage of the water electrolysis system is preferably controlled to be greater than the time tb taken to drop from $V_3$ to 0 V.

To this end, the first resistor 141 used when the unit cell voltage drops as $V_1$ to $V_2 \rightarrow V_3$ is used to be greater than the second resistor 142 used when the unit cell voltage drops as $V_3 \rightarrow 0$ V.

As described above, based on the circuit configuration according to the fourth embodiment of the present disclosure, when the operation of the water electrolysis system is stopped, the water circulation pump 30 is driven so that water supplied around the electrodes, such as an anode, can be converted from the acidic condition to the neutral condition through the water circulation inside the water electrolytic stack, and at the same time, with the operation of the first resistor 141 and the second resistor 142, the unit cell voltage in the electrolytic stack is sequentially regulated as $V_1 \sim V_2 \sim V_3 \rightarrow 0$ V to maintain the anode catalyst in a chemically stable state, thereby improving the performance, lifespan, and durability of the water electrolysis system.

Although the embodiments of the present disclosure have been described in detail, the scope of the present disclosure is not limited to the above-described embodiments, and various modifications and changes performed by those skilled in the art using the basic concepts of the present disclosure defined in the following claims are also included in the scope of the present disclosure.

What is claimed is:

1. A water electrolysis system, comprising:
a water electrolytic stack;
a water reservoir connected to the water electrolytic stack to supply water to the water electrolytic stack;
a water circulation pump supplying the water in the water reservoir to the electrolytic stack; and
a control unit configured to, during an operation stoppage of the electrolysis system, control driving of the water circulation pump to convert the water in the electrolytic stack from an acidic condition to a neutral condition and to regulate a unit cell voltage of the electrolytic stack to a voltage such that an electrolysis reaction does not occur and a chemical state of an anode catalyst is stably maintained.

2. The water electrolysis system according to claim 1, wherein the water reservoir is composed of a first water reservoir storing a neutral water from which contaminants have been removed, or the first water reservoir storing the neutral water from which contaminants have been removed and a second water reservoir storing water separated from a gas-liquid separator.

3. The water electrolysis system according to claim 2, wherein an open/close valve is mounted on an outlet line of the second water reservoir.

4. The water electrolysis system according to claim 1, further comprising: an auxiliary water circulation pump configured to rapidly convert an acidic condition of an interior of the electrolytic stack to a neutral condition during the operation stoppage of the electrolysis system.

5. The water electrolysis system according to claim 1, wherein the control unit is configured to, during the operation stoppage of the electrolysis system, adjust the unit cell voltage of the electrolytic stack to a voltage range between an upper limit ($V_1$) and a first lower limit ($V_2$) such that an electrolysis reaction does not occur and a chemical state of an anode catalyst is stably maintained in an acidic state in which the unit cell voltage is a potential of hydrogen (pH) of $K_1$; and when the pH of water in the electrolytic stack is determined to be greater than or equal to a reference pH value ($K_2$) for the operation stoppage of the electrolysis system, to drop the unit cell voltage of the electrolytic stack to a second lower limit ($V_3$) such that an electrolysis reaction does not occur and a chemical state of an anode catalyst is stably maintained in a state in which the unit cell voltage is the pH of $K_2$.

6. The water electrolysis system according to claim 5, wherein when an $IrO_2$ catalyst is used in an anode of the electrolytic stack, the pH of $K_1$ is set to 3, the upper limit ($V_1$) of the unit cell voltage to 1.23 V, and the first lower limit ($V_2$) of the unit cell voltage to 1.1 V.

7. The water electrolysis system according to claim 6, wherein the value of $K_2$ is a reference pH value indicating that the water stored in the electrolytic stack exhibits a neutral pH state for the operation stoppage of the electrolysis system, wherein when the $IrO_2$ catalyst is used in the anode, the value of $K_2$ is set to 6 to 7, and the second lower limit ($V_3$) of the unit cell voltage to 0.9 V.

8. The water electrolysis system according to claim 5, wherein the control unit is configured such that the time (ta) taken to drop the unit cell voltage as $V_1$ to $V_2 \rightarrow V_3$ so that the anode catalyst remains chemically stable upon a sudden restart during the operation stoppage of the water electrolysis system is controlled to be greater than the time (tb) taken to drop the unit cell voltage from $V_3$ to 0 V.

9. The water electrolysis system according to claim 1, wherein the control unit comprises:

a controller connected to the electrolytic stack so that a unit cell voltage of the electrolytic stack is able to be measured;

a pH sensor measuring a potential of hydrogen (pH) of water in the electrolytic stack and transmitting the measured pH to the controller;

a first switch configured to be turned on by the controller when a current needs to be supplied from a first power source to the electrolytic stack during operation of the electrolysis system;

a second switch configured to be turned on by the controller when a current needs to be supplied from the first power source to the electrolytic stack in the process of stopping the operation of the electrolysis system;

a third switch configured to be turned on by the controller when a current needs to be supplied from a second power source to the water circulation pump; and a transistor arranged between the second switch and the electrolytic stack.

10. The water electrolysis system according to claim 9, wherein in a state in which the third switch is turned on by a control signal of the controller, the water circulation pump is driven to convert the electrolytic stack from the acidic condition to the neutral condition, and in a state in which the second switch is turned on by a control signal of the controller, the unit cell voltage of the electrolytic stack is adjusted to a voltage range between an upper limit ($V_1$) and an first lower limit (V2) such that an electrolysis reaction does not occur and a chemical state of an anode catalyst is stably maintained in an acidic state in which the unit cell voltage is pH of $K_1$.

11. The water electrolysis system according to claim 9, wherein when the controller determines that the pH of water in the electrolytic stack is greater than or equal to a reference pH value ($K_2$) for operation stoppage of the electrolysis system, on the basis of a measurement signal of the pH sensor, the controller performs a PWM voltage control to turn on/off the second switch in a specified cycle so as to drop the unit cell voltage of the electrolytic stack to a second lower limit ($V_3$) such that an electrolysis reaction does not occur and a chemical state of an anode catalyst is stably maintained in a state in which the unit cell voltage is the pH of $K_2$.

12. The water electrolysis system according to claim 11, wherein after dropping the unit cell voltage to the second lower limit ($V_3$), the controller adjusts the unit cell voltage to 0 V to complete the stoppage of the electrolysis system, and stops the operation of the water circulation pump.

13. The water electrolysis system according to claim 1, wherein the control unit comprises:

a controller connected to the electrolytic stack so that a unit cell voltage of the electrolytic stack is able to be measured;

a pH sensor measuring a potential of hydrogen (pH) of water in the electrolytic stack and transmitting the measured pH to the controller;

a first switch configured to be turned on and a second switch configured to be kept off by the controller so as to supply a current from a first power source to the electrolytic stack during the operation of the electrolysis system;

a third switch configured to be turned on by the controller so as to supply a current from a second power source to the water circulation pump;

a fourth switch arranged between the electrolytic stack and the water circulation pump so as to be kept off during the operation of the electrolysis system; and a transistor arranged between the second switch and the fourth switch, wherein during the operation stoppage of the electrolysis system, the second switch is controlled to be turned on by the controller when a current needs to be supplied from the first power source to the electrolytic stack, and the fourth switch is controlled to be turned on by the controller when a residual voltage of the electrolytic stack needs to be supplied as an auxiliary power source for driving the water circulation pump.

14. The water electrolysis system according to claim 13, wherein in a state in which the fourth switch is turned on by a control signal of the controller, and the third switch is kept off, the water circulation pump is driven by using the residual voltage of the electrolytic stack as an auxiliary power source so as to convert the electrolytic stack from the acidic condition to the neutral condition, and in a state in which the second switch is turned on by a control signal of the controller, in an early stage of the operation stoppage of the electrolysis system, the unit cell voltage of the electrolytic stack is adjusted to a voltage range between an upper limit ($V_1$) and a first lower limit ($V_2$) such that an electrolysis reaction does not occur and a chemical state of an anode catalyst is stably maintained with the voltage control of the transistor.

15. The water electrolysis system according to claim 13, wherein when the controller determines that the pH of water in the electrolytic stack is greater than or equal to a reference pH value ($K_2$) for operation stoppage of the electrolysis system, on the basis of a measurement signal of the pH sensor, the controller adjusts the unit cell voltage of the electrolytic stack to a second lower limit ($V_3$) such that an electrolysis reaction does not occur and a chemical state of an anode catalyst is stably maintained in a state in which the unit cell voltage is the pH of $K_2$ so as to allow the water circulation pump to be continuously driven by using the residual voltage of the electrolytic stack as an auxiliary power source.

16. The water electrolysis system according to claim 15, wherein after the unit cell voltage is adjusted to drop to the second lower limit ($V_3$), the auxiliary power source function of the water circulation pump is performed until the residual voltage of the electrolytic stack becomes 0 V to complete the stoppage of the electrolysis system.

17. The water electrolysis system according to claim 1, wherein the control unit comprises:

a controller connected to the electrolytic stack so that a unit cell voltage of the electrolytic stack is able to be measured;

a pH sensor measuring a potential of hydrogen (pH) of water in the electrolytic stack and transmitting the measured pH to the controller;

a first switch configured to be turned on by the controller when a current needs to be supplied from a first power source to the electrolytic stack during the operation of the electrolysis system;

a second switch configured to be first turned on by the controller when a current needs to be supplied from the first power source to the electrolytic stack during the operation of the electrolysis system and then turned off by the controller in the process of stopping the operation of the electrolysis system;

a third switch configured to be turned on by the controller when a current needs to be supplied from a second power source to the water circulation pump;

a fourth switch configured to be first turned off during the operation of the electrolysis system and then turned on by the controller when the unit cell voltage of the electrolytic stack is intended to drop to 0 V for stable stoppage of the electrolysis system; and
a variable resistor arranged on a line via which a current is supplied from the first power source to the electrolytic stack.

18. The water electrolysis system according to claim 17, wherein the first switch is kept on and the second switch and the fourth switch are turned off by a control signal of the controller during operation stoppage of the electrolysis system, and the third switch is turned on to drive the water circulation pump to convert the electrolytic stack from the acidic condition to the neutral condition, whereby the unit cell voltage of the electrolytic stack is adjusted to a voltage range between an upper limit ($V_1$) and a first lower limit ($V_2$) such that an electrolysis reaction does not occur and a chemical state of an anode catalyst is stably maintained in an acidic state in which the unit cell voltage is pH of $K_1$.

19. The water electrolysis system according to claim 18, wherein when the controller determines that the pH of water in the electrolytic stack is greater than or equal to a reference pH value ($K_2$) for operation stoppage of the electrolysis system, on the basis of a measurement signal of the pH sensor, the controller adjusts the unit cell voltage of the electrolytic stack to a second lower limit ($V_3$) such that an electrolysis reaction does not occur and a chemical state of an anode catalyst is stably maintained in a state in which the unit cell voltage is the pH of $K_2$, with the operation of the variable resistor.

20. The water electrolysis system according to claim 19, wherein when the unit cell voltage ($V_a$) of the electrolytic stack is adjusted to the second lower limit ($V_3$), the unit cell voltage drops to 0 V, and the water circulation pump is stopped under the control of the controller to complete the stoppage of the electrolysis system.

21. The water electrolysis system according to claim 20, wherein a resistance value of the variable resistor when the unit cell voltage drops as $V_1$ to $V_2 \to V_3$ is controlled to be greater than a resistance value of the variable resistor when the unit cell voltage drops from $V_3$ to 0 V.

22. The water electrolysis system according to claim 1, wherein the control unit comprises:
a controller connected to the electrolytic stack so that a unit cell voltage of the electrolytic stack is able to be measured;
a pH sensor measuring a potential of hydrogen (pH) of water in the electrolytic stack and transmitting the measured pH to the controller;
a first switch configured to be turned on by the controller when a current needs to be supplied from a first power source to the electrolytic stack during the operation of the electrolysis system;
a second switch configured to be first turned on by the controller when a current needs to be supplied from the first power source to the electrolytic stack during the operation of the electrolysis system and then turned off by the controller in the process of stopping the operation of the electrolysis system;
a third switch configured to be turned on by the controller when a current needs to be supplied from a second power source to the water circulation pump;
a fourth switch configured to be first turned off during the operation of the electrolysis system and then turned on by the controller when the unit cell voltage of the electrolytic stack is intended to drop to 0 V for stable stoppage of the electrolysis system;
a first resistor and a second resistor arranged on a line via which a current is supplied from the first power source to the electrolytic stack;
a first resistor connection switch configured to be turned on by the controller such that the first resistor is used; and
a second resistor connection switch configured to be turned on by the controller such that the second resistor is used.

23. The water electrolysis system according to claim 22, wherein the first switch is kept on and the second switch and the fourth switch are turned off by a control signal of the controller during operation stoppage of the electrolysis system, and the third switch is turned on to drive the water circulation pump to convert the electrolytic stack from the acidic condition to the neutral condition, whereby the unit cell voltage of the electrolytic stack is adjusted to a voltage range between an upper limit ($V_1$) and a first lower limit ($V_2$) such that an electrolysis reaction does not occur and a chemical state of an anode catalyst is stably maintained in an acidic state in which the unit cell voltage is pH of $K_1$.

24. The water electrolysis system according to claim 23, wherein when the pH of water in the electrolytic stack is greater than or equal to a reference pH value ($K_2$) for operation stoppage of the electrolysis system, the first resistor connection switch for the first resistor is turned on so that the unit cell voltage of the electrolytic stack is adjusted to a second lower limit ($V_3$) such that an electrolysis reaction does not occur and a chemical state of an anode catalyst is stably maintained in a state in which the unit cell voltage is the pH of $K_2$, with the operation of the first resistor.

25. The water electrolysis system according to claim 24, wherein when the unit cell voltage of the electrolytic stack is adjusted to the second lower limit ($V_3$), the second resistor connection switch for the second resistor is turned on so that the unit cell voltage drops to 0 V with the operation of the second resistor for stable stoppage of the electrolysis system, and the water circulation pump is stopped under the control of the controller to complete the stoppage of the electrolysis system.

26. The water electrolysis system according to claim 25, wherein the first resistor when the unit cell voltage drops as $V_1$ to $V_2 \to V_3$ is controlled to be greater than the second resistor when the unit cell voltage drops from $V_3$ to 0 V.

* * * * *